United States Patent [19]

Humbert, Jr.

[11] Patent Number: 4,732,678

[45] Date of Patent: Mar. 22, 1988

[54] FILTER BODY HAVING CLOSELY ADJACENT FILTER MATERIAL

[75] Inventor: Kingsley E. Humbert, Jr., Gastonia, N.C.

[73] Assignee: Wix Corporation, Gastonia, N.C.

[21] Appl. No.: 858,016

[22] Filed: May 1, 1986

[51] Int. Cl.$^4$ ............................................. B01D 26/06
[52] U.S. Cl. .................................... 210/440; 210/446; 210/457; 210/493.1; 210/497.01; 55/498; 55/500; 55/521
[58] Field of Search ............... 210/435, 437, 440, 443, 210/444, 448, 452, 457, 493.1, 493.5, 497.01, DIG. 13, DIG. 17, 446; 55/498, 500, 521, 529

[56] References Cited

U.S. PATENT DOCUMENTS

| | | |
|---|---|---|
| 3,279,609 | 10/1966 | Francois . |
| 3,317,045 | 5/1967 | Dummler ............................ 210/435 |
| 3,392,843 | 7/1968 | Mumby ............................ 210/493.1 |
| 3,490,594 | 1/1970 | Hutchins, Jr. ...................... 210/444 |
| 3,506,475 | 4/1970 | MacDonnell ...................... 210/993.1 |
| 4,046,697 | 9/1977 | Briggs et al. ..................... 210/493.1 |
| 4,310,419 | 1/1982 | Nara et al. ........................ 210/493.5 |

FOREIGN PATENT DOCUMENTS

| | | | |
|---|---|---|---|
| 145885 | 6/1985 | European Pat. Off. ......... 210/493.5 |
| 2445454 | 4/1976 | Fed. Rep. of Germany .... 210/D17 |
| 601918 | 5/1948 | United Kingdom ............. 210/493.1 |
| 649445 | 3/1979 | U.S.S.R. .......................... 210/493.1 |

Primary Examiner—Richard V. Fisher
Assistant Examiner—Wanda L. Millard
Attorney, Agent, or Firm—Shoemaker and Mattare, Ltd.

[57] ABSTRACT

A filter device comprising a cannister container of impervious material having therewithin a pleated filter with at least one of the side edges of each of the individual pleats being sealed. Appropriate inlet/outlet structure is provided with the cannister body, as well as an appropriate support base for holding same. In one embodiment, the pleated filter material has both side edges of the individual pleats sealed and large spaced flow passageways between the respective edges are provided by a plurality of seals between the edges. Another embodiment has only one side edge of the individual pleats sealed with the other side edge being open for collectively sealing same by the structure of the cannister body itself. In this embodiment, a larger plurality of fluid flow passageways are provided by multiple sealed portions between the respective side edges of the individual pleats. After the pleated material is formed and sealed, the overall structure is formed in the shape of a torus for appropriate mounting in one of the various cannisters.

28 Claims, 17 Drawing Figures

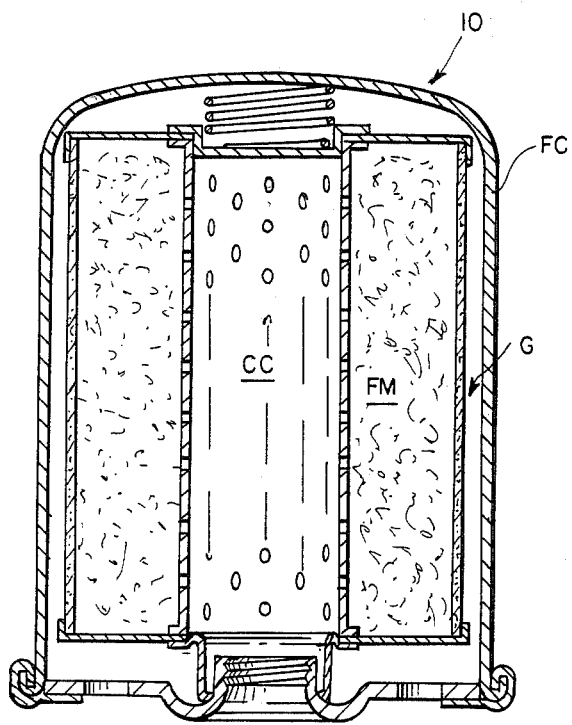
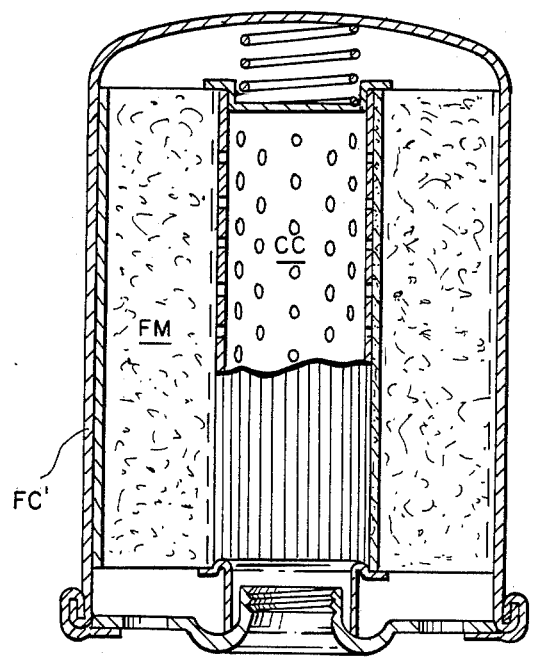
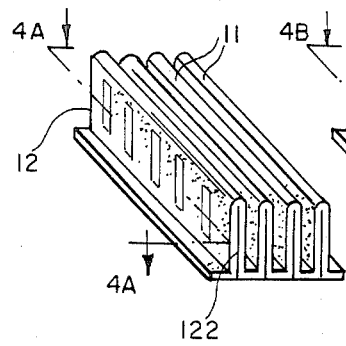
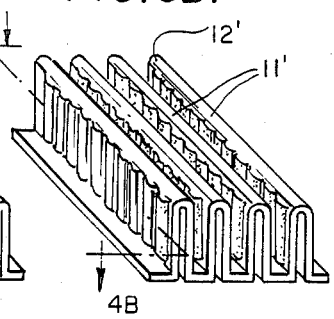
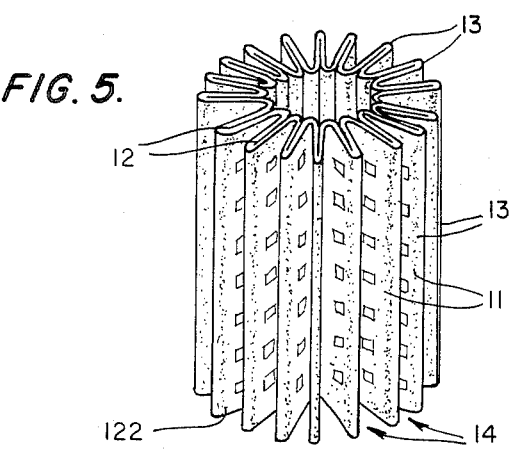
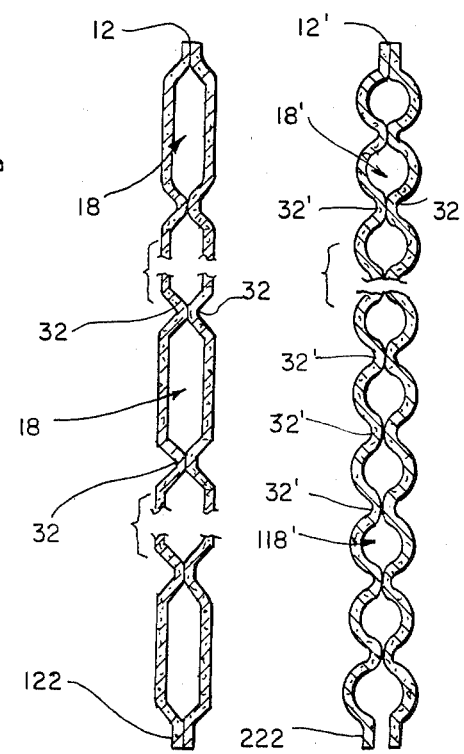

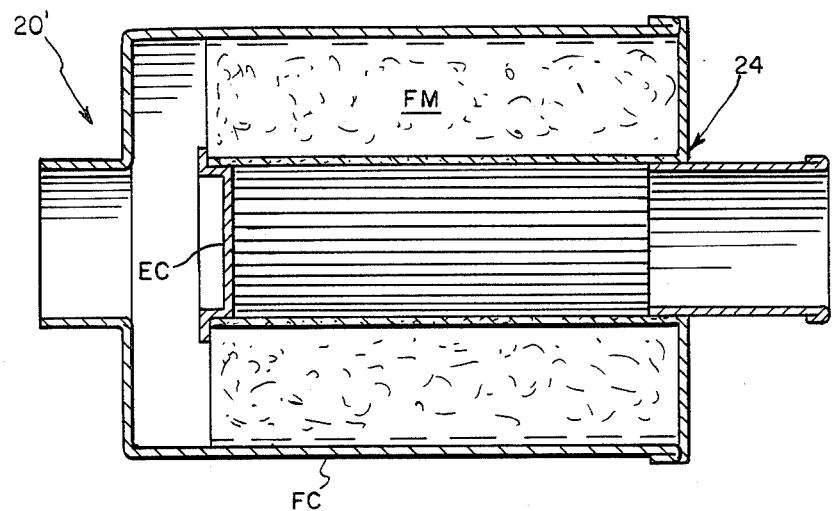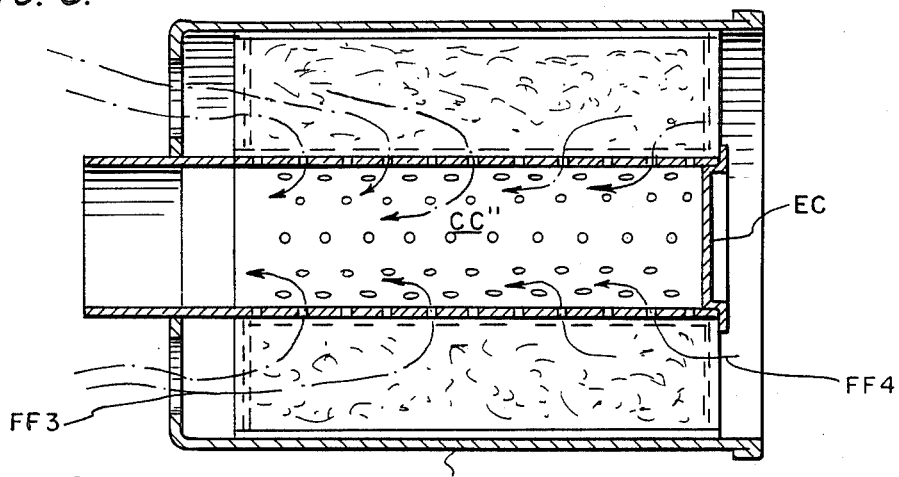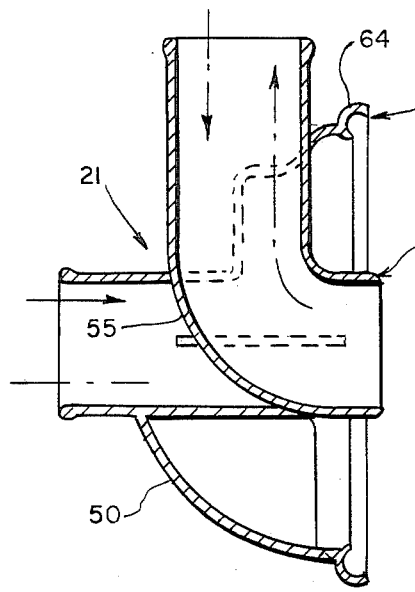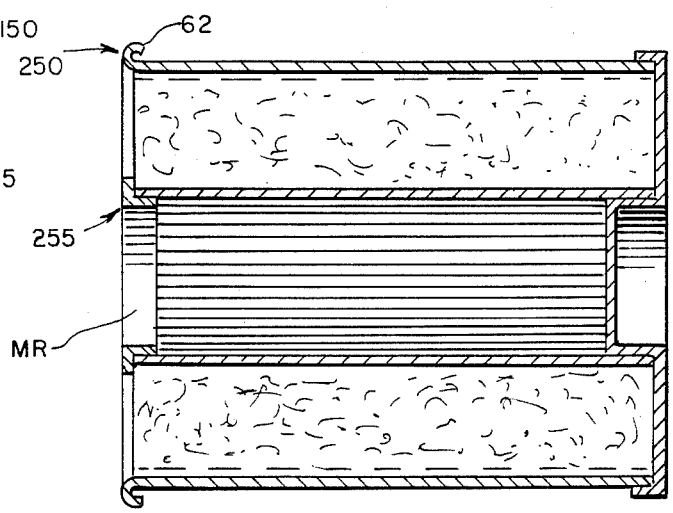

FILTER BODY HAVING CLOSELY ADJACENT FILTER MATERIAL

BACKGROUND OF THE INVENTION

1. Field of the Invention

This invention relates generally to filter devices for use in filtering air and fluids, such as oil, gasoline, and the like.

2. Description of the Prior Art

A common problem with known-type filters is that they generally provide a gap between the outside circumferential surface of the actual filter material and the inside surface of the physical container therefor. This gap does permit flow through the outside edges of the filter material itself, however, it does require that a larger overall container be used than is absolutely necessary.

Another problem with known-type filters is that the filter material itself, while oftentimes of pleated construction, fails to provide as great and sufficient filtering as is desirable for the actual space used by same.

Another problem with known-type filters is that the overall construction is such that maximum filtering effectiveness is not achieved for a given sized container. None of the known prior art devices offer the new and novel features of the present invention.

SUMMARY OF THE INVENTION

An object of the present invention is to provide an improved filter device wherein the gap which is normally provided with conventional-type filters between the outer surface of the actual filter material and the inner surface of the overall container is completely eliminated.

Another object of the present invention is to provide a filter device having pleated filter material therein with the outer folds of the respective pleats being directly in contact with the inside surface of the container itself.

A further object of this invention is to provide a filter device having a pleated filter material with at least one side edge of each of the respective pleats sealed.

A still further object of the present invention is to provide pleated filter material having both side edges of each of the respective pleats sealed.

Another further object is for providing a filter material having a plurality of contiguous pleats with each pleat having at least one outer edge sealed and a plurality of contacting junctions spaced therealong to the other edge thereof. The spaces between the contacting portions providing passageways for fluid flow therethrough.

The present invention has a number of new and novel features. Among them are the elimination of the normal gap between the outside circumferential surface of the actual filter material and the inside circumferential surface of the container body therefor. In addition, the actual filter material is formed with a plurality of contiguous pleats, each pleat having at least one side edge thereof sealed and, furthermore, provided with a plurality of contacting portions therealong to the other side edge. This second side edge may be open, or also sealed similarly to the first edge. With the open-type second edge, the open edge shall be collectively sealed by use of appropriate structure within the container as the overall filter device is assembled.

In one embodiment of the pleated filter material, the contacting portions between the side edges of the respective pleats are very close together with the fluid passageways therebetween also being closely spaced together. In another embodiment the contacting portions between the side edges of the respective pleats are spaced further apart and the fluid flow passageways therebetween are larger, not necessarily further apart. In either embodiment, once the plurality of pleated portions are formed, the overall material may then be formed into a torus for insertion into a container can of the filter device. Upon insertion of the formed pleated filter material into the container, the outer folds of the pleats directly contact the inner surface of the container. Of course, this provides physical support for the filter material, so that, in many cases, complete elimination of any central core within the pleated filter material can be effected. Elimination of this central core not only reduces the actual cost of the filter, but it also reduces time for assembly thereof, and makes the types of physical mountings for the overall filter device simpler and more versatile.

One type of mount can be of conventional spin-on type construction, another type can be a central rod having a manual wing nut for the threaded end thereof, and another type of mount may be a plurality of spring-type clamps around an open flared edge of the filter cannister and a complementary edge on the base mount therefor. Still another embodiment may employ a large screw-on type open cannister end for engagement with a complementary threaded male projection on the base support structure, or vice versa male to female.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 shows a side elevation of a prior art type filter device with the conventional gap between the outer surface of the actual filter material and the inner surface of the filter container.

FIG. 2 shows a similar side elevation of the improved filter device of the present invention, wherein the gap of the prior art has been eliminated.

FIG. 3A shows the filter material of the present invention of multiple pleat construction with both edges of each pleat sealed, and FIG. 3B shows a similar construction with only one edge of each pleat sealed.

FIG. 4A shows a cross-section taken generally along line 4A—4A of FIG. 3A and FIG. 4B shows a similar cross-section taken along lines 4B—4B of FIG. 3B.

FIG. 5 shows a perspective view of the pleated material of the FIG. 3A embodiment formed in the shape of a torus. Of course, the FIG. 3B embodiment would be so formed too.

FIG. 7 shows a further modification of the embodiment of FIGS. 6A and 6B.

FIG. 8 shows an embodiment using the pleated filter material of FIGS. 3A and 4A wherein both ends of the pleated filter material have been sealed individually.

FIG. 9 shows a further embodiment of the filter device utilizing the pleated filter material of FIGS. 3B, 4B.

FIG. 10 shows a mounting structure for the filter device of FIG. 9.

DESCRIPTION OF THE PREFERRED EMBODIMENTS

Figure 6A:
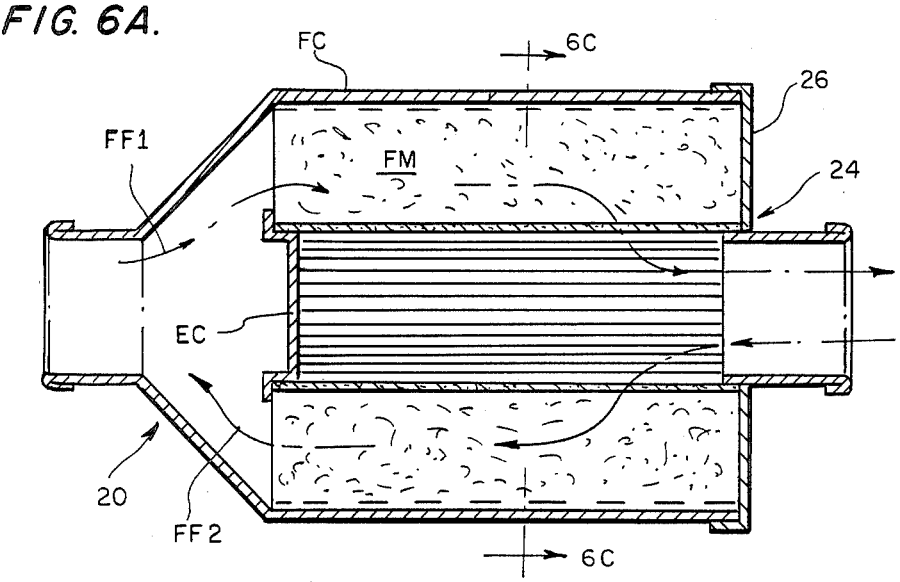
FIG. 6A shows an in-line filter device utilizing the pleated filter material of FIGS. 3B, 4B embodiment.

Referring to FIG. 1 of the drawing, reference numeral 10 indicates in general a conventional type filter as known in the prior art. An outer filter can FC holds therewithin a central core CC with conventional filter material FM being supported thereby. A gap G normally exists between the outer circumference of the filter material FM and the inner circumferential surface of the filter can FC. One of the purposes of the present invention is to eliminate this gap.

FIG. 2 shows the improved filter construction of the present invention wherein the gap normally present in conventional type filters has been completely eliminated. A central core CC' is shown supporting filter material FM' within the filter container FC'. However, the previously provided gap is no longer present. The elimination of this gap also means that the filter container or cannister FC' now provides support for the filter material FM' and thereby, in many applications, the central core CC' also can be eliminated. Elimination of central core CC' also permits elimination of some of the necessary support structure previously required therefor. See FIG. 6C.

FIGS. 3A and 3B show two embodiments of the improved pleated filter material for use in the present invention. A plurality of formed pleats 11, 11' are provided with at least one side edge thereof being sealed. The side edge 12 or 12' of the embodiments of FIGS. 3A and 3B is sealed. However, in the FIG. 3A embodiment, the side edge 122 opposite thereto has also been sealed. Also in the FIG. 3A embodiment, as best seen in the cross-section of FIG. 4A, contacting portions 32 are spaced between the sealed side edges 12 and 122 for providing enlarged flow passageways 18 therebetween. FIGS. 3B and 4B show the modified version of the multiple pleated filter construction of FIGS. 3A and 4A. In this version, the side edge 12' is sealed similarly to side edge 12 of the first embodiment, however, the other side edge 222 is left open. Also, the contacting portions spaced between the side edges 12' and 222 are quite closely spaced together as indicated by reference numeral 32', thus providing closely spaced fluid passageways 18' between the respective side edges. While the flow passageways 18' are more closely spaced, their overall size is reduced from that of the passageways 18 of the first embodiment.

With either type pleated filter construction, after the pleated layers are formed, they then, preferably, are cut to the desired length and formed into a torus shape as depicted in FIG. 5. As shown in FIG. 5, the outer folds 13, or 13' of the pleats 11, 11' extend radially from the central area of the filter material to provide a plurality of pie-shaped spaces 14 therebetween. In the version shown in FIG. 5, the sealed edges 12 of the FIG. 3A/4A embodiment can be clearly seen. Of course, the other end having side edges 122, which are also sealed, are indicated. A similar type torus can be formed with the pleated material version of FIGS. 3B and 4B in similar manner. While other type of pleated filter may be used with the various container embodiments described below, preferably the embodiment of FIGS. 3B, 4B are used where an endplate is used with the filter cannister for closing the non-sealed ends 222 thereof. The filter material, having both ends sealed, preferably is used with the embodiments such as FIG. 8, where flow may occur through both of the respective ends of the filter material.

Figure 6B:
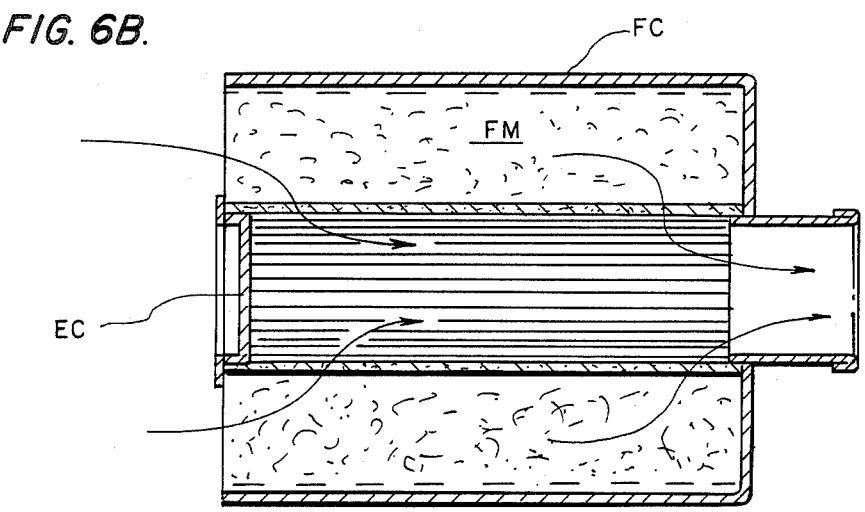
FIG. 6B shows another version of the embodiment of FIG. 6A. Note the omission of a central core.
Figure 6C:
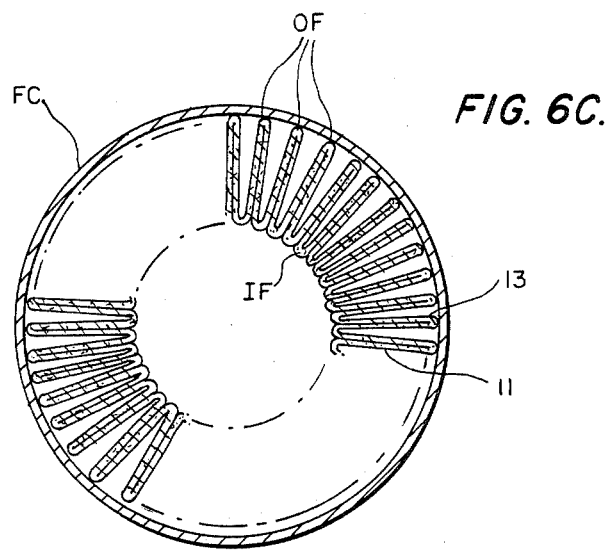
FIG. 6C shows a cross-section taken generally along line 6C—6C of FIG. 6A.

FIGS. 6A and 6B show, respectively, two embodiments of completed filter devices. In FIG. 6A, an inlet/outlet nipple 20 is provided on the left side thereof and the modified inlet/outlet nipple 24 is provided at the other end thereof. The flange portion 26 of the second inlet/outlet nipple 24 is provided with a film of adhesive and thereby seals the normally open edges 222 of the FIGS. 3B, 4B embodiment. Fluid flow lines FF1 and FF2 show how the filter can perform its desired function with flow in either direction. FIG. 6B shows a modified embodiment of that of FIG. 6A. In both embodiments, an end cap EC closes one end of the normally open central portion of the torus shaped filter material. FIG. 6C shows the plurality of pleats in cross-section. Attention is directed to the omission of the central core and the increased flow area in the central region of the filter. This is achieved by having the circle diameter of the inner folds IF approximately one-half the circle diameter of the outer folds OF, as best seen in this and the FIG. 5 views.

In FIG. 7, another inlet/outlet nipple 20' of modified shape is shown. In FIG. 8, a container structure for the filter material of FIGS. 3A and 4A is shown. The outer cannister body 19 of this embodiment supports the outer circumferential surface of the multiple pleats of the torus shaped filter. A central core CC" is shown in this version, however, sufficient support generally is provided by the outer cannister 19 so that this central core oftentimes may be eliminated. As shown in this embodiment, filter flow FF3 and FF4 can take place between each of the respective ends of the pleated filter material and the inner area thereof.

FIG. 9 shows a further embodiment similar to those already shown, however, one end of the device is completely enclosed by an endcap 45. In this embodiment, the central core CC of the earlier embodiments has been eliminated and instead only a molded ring MR is provided at the open end of this device.

FIG. 10 shows a support base for the filter device of FIG. 9. This support base, indicated generally by reference numeral 21, has an outer support structure 50 supporting integrally therewith an inner passage structure 55. The circumferential edges 150 and 155 of the respective inlet/outlet structures mate with appropriate complementary structures 250, 255 on the filter device.

Figure 11:
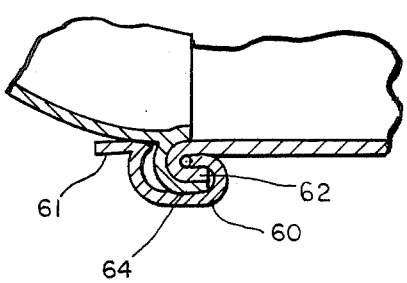
FIG. 11 shows a side clamp which may be used to hold the filter of FIG. 9 with the base of FIG. 10.

As shown in FIG. 11, a plurality of spring clips 60 with handle 61 may be provided for engaging the respective raised flange portions 62 and 64 of the filter itself and the support base.

Figure 12:
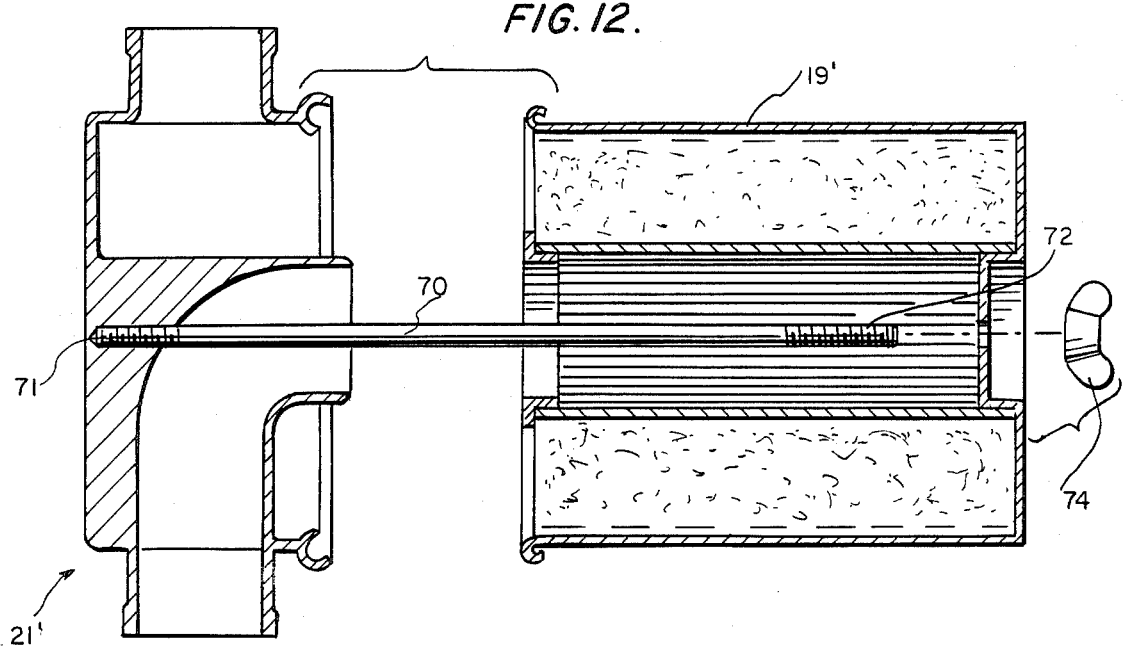
FIG. 12 shows another modification for attaching the filter device of FIG. 9 to the base structure of FIG. 10.

FIG. 12 shows a modification of the embodiments of FIGS. 9 and 10, wherein a central rod 70 is screwed into a tapped opening 71 on the support structure 21'. The other end of rod 70 is also threaded 72 for reception of a thumb nut 74 thereon. In this embodiment, the filter device 19' can be quickly and easily removed and replaced merely by loosening and removing the thumb nut 74 from the end of rod 70.

Figure 13:
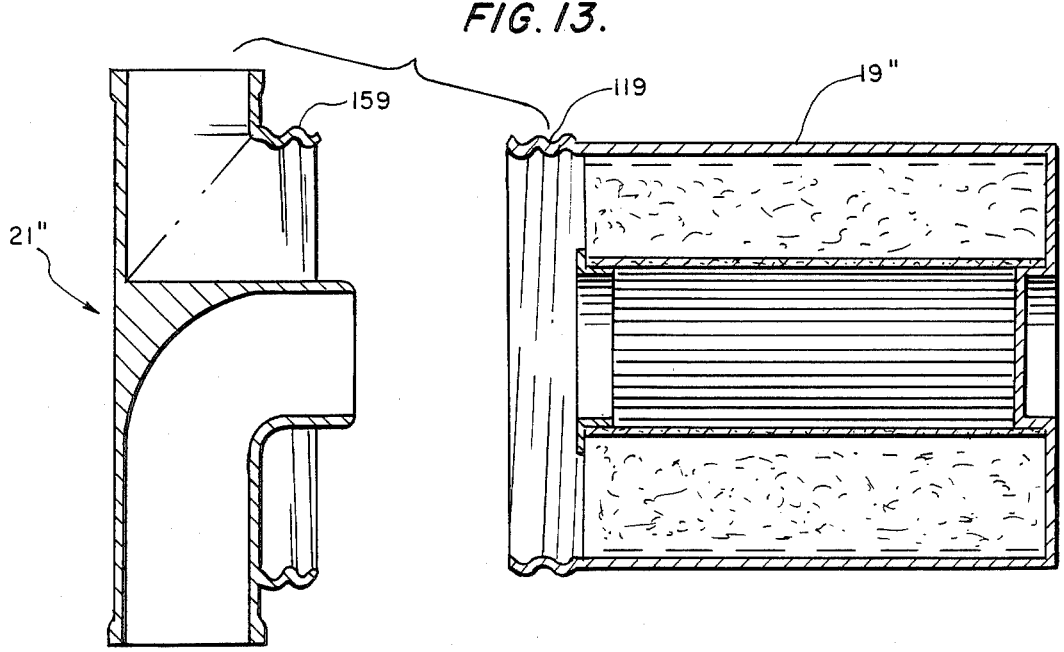
FIG. 13 shows a threaded mount for a modified arrangement of FIGS. 9 and 10.

In the embodiment of FIG. 13, another filter unit 19" is provided having a threaded portion adjacent the open end thereof 119 for complementary engagement with a male projection 159 likewise threaded on the support base 21".

Of course, any of the embodiments depicted can be used with either of the pleated filter constructions of FIGS. 3A, 4A and 3B, 4B, but, preferably, the embodiment of pleated filter material having both side edges sealed is used whenever fluid flow is desired from both directions of the overall filter device, and the embodiment with the open side edge 222 is used when the filter structure provides collective sealing of this side edge.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A filter device comprising:
   an impervious container body open at at least one end thereof;
   a pleated filter having a plurality of substantially radially disposed pleats mounted in said container body;
   each radially disposed pleat comprising a double layer of filter material with inner folds connecting each pleat to the adjacent pleats;
   outer folds of each pleat throughout the length of said pleated filter being in direct contact with the inner surface of said container body for positive support thereby; and
   at least one edge of each of the double layers of each of the respective pleats of said pleated filter being sealed together individually.

2. A filter device of claim 1, wherein said pleated filter material is formed into the shape of a torus.

3. A filter device of of claim 2, wherein said pleated filter material in the shape of a torus is supported entirely by the container body without any gap therebetween, and without any inner core being provided for said pleated filter material central portion.

4. A filter device of claim 3, wherein attachment means is provided for affixing said container body upon an appropriate support base.

5. A filter device of claim 4, wherein said affixing means includes threaded portions on the respective units.

6. A filter device of claim 4, wherein said affixing means includes a plurality of side clamps for engagement with appropriate external ridges provided on the filter container body as well as the support base therefor.

7. A filter device of claim 2, wherein the inner folds of said pleated filter material have approximately an inner diameter of one-half the outer folds of said pleated filter material.

8. A filter device of claim 1, wherein both edges of each of the double layers of the respective pleats of said pleated filter are sealed together.

9. A filter device of claim 8, wherein said container body is open at both ends thereof.

10. A filter device of claim 9, wherein both of said open ends of said container body are provided with inlet/outlet nipples.

11. A filter device of claim 1, wherein said container body is open at both ends thereof.

12. A filter device of claim 11, wherein both of said open ends of said container body are provided with inlet/output nipples.

13. A filter device of claim 1, wherein attachment means is provided for affixing said container body upon an appropriate support base.

14. A filter device of claim 13, wherein said attaching means includes threaded portions on the respective body and base.

15. A filter device of claim 13, wherein said attaching means includes a plurality of side clamps for engagement with appropriate external ridges provided on the filter container body as well as the support base therefor.

16. A filter device of claim 1, wherein said pleated filter material, having only one end of said pleats individually sealed, is provided with enclosure structure for collectively sealing the other unsealed ends of the individual pleats.

17. A filter device of claim 16, wherein said pleated material is formed into the shape of a torus.

18. A filter device comprising a canister containing pleated filter material therewithin and having outer folds throughout the length of the pleated filter material in direct contact with the inner surface of said canister, each pleat including two substantially parallel layers of filter material connected by an outer fold, with the respective pleats joined to each other by inner folds, said pleated filter material having the layers of each of the pleats individually sealed at both ends thereof.

19. A filter device of claim 18, wherein said pleated filter material is formed into the shape of a torus.

20. A filter device of claim 19, wherein said pleated filter material in the shape of a torus has a fluid permeable central core.

21. A filter device of claim 20, wherein attachment means is provided for affixing said container body upon an appropriate support base.

22. A filter device of claim 21, wherein said affixing means includes threaded portions on the respective units.

23. A filter device of claim 21, wherein said affixing means includes a plurality of side clamps for engagement with appropriate external ridges provided on the filter container body as well as the support base therefor.

24. A filter device of claim 19, wherein said pleated filter material in the shape of a torus is supported by the container body without any gap therebetween, and an inner fluid permeable central core is provided for said pleated filter material central portion.

25. A filter device of claim 24, wherein said container is provided with attaching means for affixing same to a support base, with said support base being provided with appropriate inlet and outlet openings therein.

26. A filter device of claim 24, wherein the inner folds of said pleated filter material have approximately an inner diameter of one-half the outer folds of said pleated filter material.

27. A filter device comprising a canister containing pleated filter material therewithin and having outer folds of the pleated filter material in direct contact with the inner surface of said canister, said pleated filter material having the pleats individually sealed at at least one end thereof;

said pleated filter material, having only end of said pleats individually sealed, being provided with enclosure structure for collectively sealing the other unsealed ends of the indivdual pleats;

said pleated filter material being formed into the shape of torus; and said pleated filter material in the shape of torus being supported entirely by the container body without any gap therebetween, and without any inner core being provided for said pleated filter material central portion.

28. A filter device of claim 27, wherein said container is provided with attaching means for affixing same to a support base, with said support base being provided with appropriate inlet and outlet openings therein.

* * * * *